(12) United States Patent  (10) Patent No.: US 9,045,889 B2
Schuster et al.  (45) Date of Patent: Jun. 2, 2015

(54) CONTROL OF TOILET BOWL FILL FLOW

(71) Applicant: Danco, Inc., Irving, TX (US)

(72) Inventors: Michael J. Schuster, Shorewood, IL (US); Michael J. D'Aurelio, Marietta, GA (US)

(73) Assignee: Danco, Inc., Irving, TX (US)

( * ) Notice: Subject to any disclaimer, the term of this patent is extended or adjusted under 35 U.S.C. 154(b) by 0 days.

(21) Appl. No.: 14/072,089

(22) Filed: Nov. 5, 2013

(65) Prior Publication Data
US 2014/0053329 A1  Feb. 27, 2014

Related U.S. Application Data (62) Division of application No. 11/050,317, filed on Feb. 3, 2005, now Pat. No. 8,590,067.

(51) Int. Cl.
E03D 1/00  (2006.01)
E03D 1/32  (2006.01)
E03D 5/10  (2006.01)
G01F 23/76  (2006.01)

(52) U.S. Cl.
CPC ........ E03D 1/32 (2013.01); E03D 5/105 (2013.01); G01F 23/76 (2013.01)

(58) Field of Classification Search
CPC .................................. E03D 1/32; E03D 5/105
USPC .............. 4/302, 313, 314, 324, 345, 406, 415
See application file for complete search history.

(56) References Cited

U.S. PATENT DOCUMENTS

| | | |
|---|---|---|
| 3,495,803 A | 2/1970 | Schoepe et al. |
| 3,986,216 A | 10/1976 | Davis et al. |
| 3,994,628 A | 11/1976 | Kemper |
| 4,007,498 A | 2/1977 | Pearson |
| 4,017,916 A | 4/1977 | Pearson |
| 4,032,822 A | 6/1977 | Un |
| 4,065,095 A | 12/1977 | Johnson |
| 4,080,986 A | 3/1978 | Schoepe |
| 4,090,532 A | 5/1978 | Story, Jr. |
| 4,100,928 A | 7/1978 | Schoepe |
| 4,108,202 A | 8/1978 | Schoepe |
| 4,145,775 A | 3/1979 | Butler |
| 4,180,096 A | 12/1979 | Johnson |
| 4,182,364 A | 1/1980 | Gilbert et al. |

(Continued)

OTHER PUBLICATIONS

Author Unknown, "Bowl Dog—Alerts you of toilet tank overfill and underfill", Internet Website at http://www.bowldog.com/BD.sub.--Home.html, 2003 (Month Unknown).

(Continued)

*Primary Examiner* — Tuan N Nguyen
(74) *Attorney, Agent, or Firm* — Thomas | Horstemeyer, LLP.

(57) ABSTRACT

Various systems and methods of controlling the flow of water from a fill valve in a toilet tank to a toilet bowl of a toilet using a bowl fill valve are provided. An inlet of the bowl fill valve is coupled to a bowl fill outlet of the fill valve and the outlet of the bowl fill valve is channeled to the toilet bowl. In illustrative embodiment, a method is provided comprising the steps of determining when the toilet tank has been substantially drained of water during a flush cycle, and opening the bowl fill valve for a predefined period of time after the toilet tank has been substantially drained of water to fill the toilet bowl of the toilet with water. The predefined period of time is less than a total time of the flush cycle.

20 Claims, 6 Drawing Sheets

(56) References Cited

U.S. PATENT DOCUMENTS

| | | |
|---|---|---|
| 4,240,606 A | 12/1980 | Johnson |
| 4,286,619 A | 9/1981 | Straus |
| 4,327,941 A | 5/1982 | Schoepe |
| 4,338,964 A | 7/1982 | Schoepe |
| 4,340,082 A | 7/1982 | Straus |
| 4,345,619 A | 8/1982 | Johnson |
| 4,392,260 A | 7/1983 | Bensen |
| 4,416,302 A | 11/1983 | Schoepe |
| 4,420,845 A | 12/1983 | Antunez |
| 4,574,826 A | 3/1986 | Johnson |
| 4,600,031 A | 7/1986 | Nestich |
| 4,646,779 A | 3/1987 | Johnson |
| 4,703,653 A | 11/1987 | Schoepe et al. |
| 4,707,867 A | 11/1987 | Kawabe et al. |
| 4,764,996 A | 8/1988 | Pino |
| 4,765,363 A | 8/1988 | Pi-Yu |
| 4,793,588 A | 12/1988 | Laverty, Jr. |
| 4,819,484 A | 4/1989 | White |
| 4,858,252 A | 8/1989 | Johnson |
| 4,887,635 A | 12/1989 | Johnson |
| 4,918,764 A | 4/1990 | Haselswerdt et al. |
| 4,938,245 A | 7/1990 | Schoepe et al. |
| 4,945,944 A | 8/1990 | Chen |
| 4,973,402 A | 11/1990 | Johnson et al. |
| 4,980,932 A | 1/1991 | Stemples |
| 5,007,452 A | 4/1991 | Antunez |
| 5,035,257 A | 7/1991 | Antunez |
| 5,036,553 A | 8/1991 | Sanderson |
| 5,052,060 A | 10/1991 | Makita et al. |
| 5,133,089 A | 7/1992 | Tsutsui et al. |
| 5,134,729 A | 8/1992 | Shaw |
| 5,211,204 A | 5/1993 | Mlkol |
| 5,245,710 A | 9/1993 | Haselswerdt et al. |
| 5,255,703 A | 10/1993 | Johnson |
| 5,280,803 A | 1/1994 | Swift et al. |
| 5,287,882 A | 2/1994 | Mikol |
| 5,315,719 A | 5/1994 | Tsutsui et al. |
| 5,362,026 A | 11/1994 | Kobayashi et al. |
| 5,392,470 A | 2/1995 | Johnson |
| 5,421,361 A | 6/1995 | Johnson |
| 5,432,959 A | 7/1995 | Ellsworth et al. |
| 5,439,025 A | 8/1995 | Johnson |
| 5,469,586 A | 11/1995 | Tsutsui et al. |
| 5,517,701 A | 5/1996 | Johnson |
| 5,611,090 A | 3/1997 | Johnson |
| 5,623,961 A | 4/1997 | Nichols-Roy |
| 5,625,906 A | 5/1997 | Johnson |
| 5,708,991 A | 1/1998 | DeMarco |
| 5,715,859 A | 2/1998 | Nichols-Roy |
| 5,715,860 A | 2/1998 | Horad |
| 5,738,141 A | 4/1998 | Blanke et al. |
| 5,836,346 A | 11/1998 | Nichols-Roy |
| 5,878,775 A | 3/1999 | Tamburro, Jr. |
| 5,975,125 A | 11/1999 | Nichols-Roy |
| 6,047,725 A | 4/2000 | Gish et al. |
| 6,058,519 A | 5/2000 | Quintana |
| 6,202,227 B1 | 3/2001 | Gurowitz |
| 6,209,576 B1 | 4/2001 | Davis |
| 6,263,519 B1 | 7/2001 | Parsons et al. |
| 6,295,660 B1 | 10/2001 | Schuster |
| 6,367,096 B1 | 4/2002 | Quintana |
| 6,478,044 B2 | 11/2002 | Howe |
| 6,546,568 B1 | 4/2003 | Schuster |
| 6,560,790 B2 | 5/2003 | Saar et al. |
| 6,659,125 B1 | 12/2003 | Autunez |
| 6,679,285 B2 | 1/2004 | Pablo |
| 6,679,287 B2 | 1/2004 | Huang |
| 6,810,902 B2 | 11/2004 | Bootka |
| 6,823,889 B1 | 11/2004 | Schuster |
| 6,934,977 B1 | 8/2005 | Quintana et al. |
| 7,000,627 B1 | 2/2006 | Johnson |
| 7,028,347 B2 | 4/2006 | Sanderson |
| 7,047,574 B2 | 5/2006 | Patterson |
| 7,650,652 B2 | 1/2010 | Schuster et al. |
| 2002/0092090 A1 | 7/2002 | Johnson |
| 2002/0162166 A1 | 11/2002 | Saar et al. |
| 2004/0168247 A1 | 9/2004 | Patterson |
| 2006/0112478 A1 | 6/2006 | Kolar et al. |
| 2006/0162788 A1 | 7/2006 | Arigoni |
| 2006/0168716 A1 | 8/2006 | Schuster et al. |
| 2006/0168717 A1 | 8/2006 | Schuster et al. |

OTHER PUBLICATIONS

Hamelain, J. C., "Liquid Level Control Using a Motorola Pressure Sensor", Motorola Semiconductor Application Note AN1516, pp. 1-8, 2002 (Month Unknown).

Author Unknown, "Arichell Technologies Components Group Catalog", Arichell Technologies, pp. 1-19, Date Unknown.

Author Unknown, "Arichell Technolgies, Inc. Component Sales Application Notes", Arichell Technologies, pp. 1-7, 2003 (Month Unknown).

International Search Report for PCT/US06/00770 dated Nov. 7, 2007.

International Search Report for PCT/US06/00871 dated Nov. 7, 2007.

CONTROL OF TOILET BOWL FILL FLOW

CROSS REFERENCE TO RELATED APPLICATIONS

This application is a divisional application of U.S. patent application entitled "CONTROL OF TOILET BOWL FILL FLOW" having Ser. No. 11/050,317, filed Feb. 3, 2005, the entirety of which is hereby incorporated by reference.

BACKGROUND

Toilets have been a source of wasted water for decades. Specifically, in a typical toilet flush, an amount of water is routed from the water inlet of a toilet fill valve to the toilet bowl. This flow of water generally occurs during the entire flush cycle of a toilet. The toilet bowl is filled by this flow after the toilet tank has emptied during a flush cycle. A problem exists in that the time it takes to fill a typical toilet bowl is much less than the time it takes to refill the toilet tank during a flush cycle. As a consequence, once the toilet bowl is full during the flush cycle, the flow of water that continues into the toilet bowl simply goes down the drain. This results in a loss of billions of gallons of water each year given the millions of operating toilets in existence today. This loss is unacceptable given the water shortages developing in the United States and around the world.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
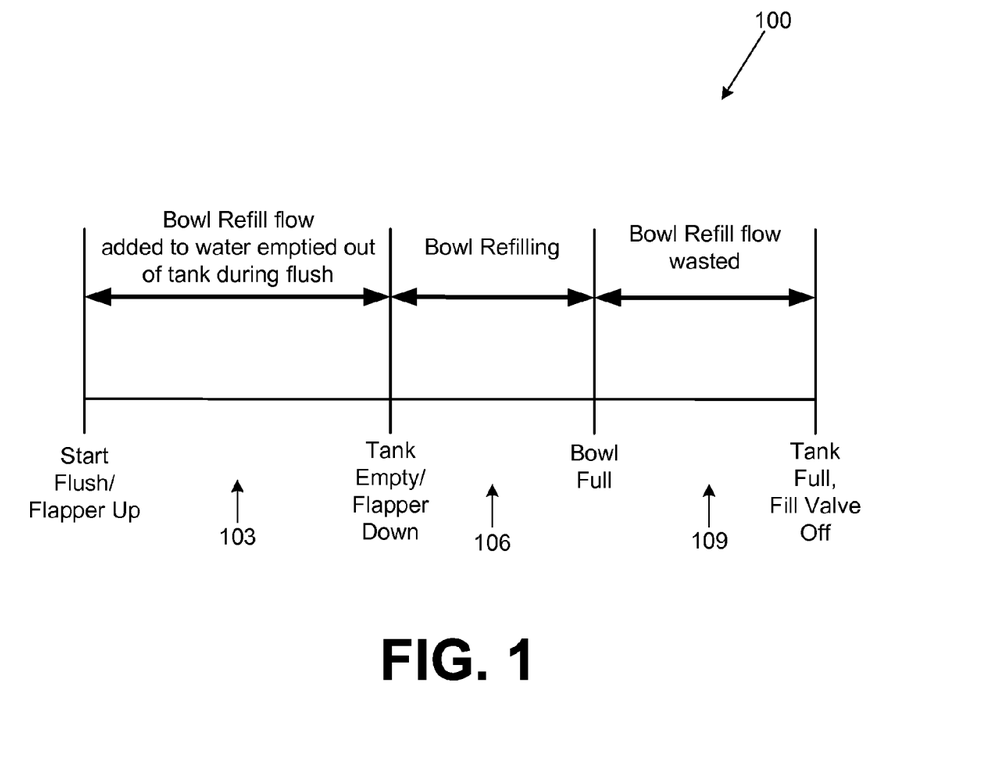
FIG. 1 is a diagram illustrating a flush cycle according to an aspect of the present invention.

Referring to FIG. 1, shown is a diagram of a flush cycle 100 of a toilet. As shown, the flush cycle 100 begins when an individual "pulls the handle" of the toilet which causes a flapper within the toilet to pull up and allow water to drain from the toilet tank into the toilet bowl. At the same time, a fill valve within the toilet is activated when the water level of the toilet drops. The fill valve employs a float that activates the fill valve when water drops below a predefined threshold. When in an open state, the fill valve allows water to flow into the toilet tank.

A first phase 103 of the flush cycle 100 occurs upon the initiation of the flush cycle 100 in which the flapper has been raised and the toilet tank is drained into the toilet bowl. In the first phase 103, the water flows out of the toilet tank and into the toilet bowl to wash waste down the drain of the toilet. At the same time, a float on the fill valve falls with the level of the water in the tank, thereby opening the fill valve. When open, an amount of water is directed from the fill valve to an overflow tube that also drains into the toilet bowl. This flow is employed to refill the toilet bowl after the toilet tank has been emptied of water during the flush cycle.

When the toilet tank has been emptied of water in the course of a flush cycle 100, then the flapper falls over the opening in the toilet tank and the toilet tank begins to refill. At this point, the flush cycle 100 enters a second phase 106 of operation in which the flow of water from the fill valve that is directed to the overflow tube refills the toilet bowl. Thus, during the second phase 106 of the flush cycle 100, the toilet bowl and the toilet tank are simultaneously refilled by the fill valve within the toilet tank. For a typical toilet, the toilet bowl is refilled in a shorter period of time than it takes to refill the entire toilet tank.

When the toilet bowl is full, then the flush cycle 100 proceeds to the third phase 109 of the flush cycle in which the toilet tank continues to be filled and water is continually applied to the toilet bowl through the overflow tube at the same time. However, since the toilet bowl has already been filled, this water is wasted as it simply flows down the drain. In this third phase 109, the flow of water employed to refill the toilet bowl is entirely wasted and continues to be wasted until the toilet tank is full and the fill valve is shut off when the toilet tank is full by operation of the float associated with the fill valve. Thus it is seen that in the first phase and the third phase of a flush cycle, that the flow of water employed to refill the toilet bowl is essentially wasted as the water simply flows down the drain. Given the millions of toilets in operation in the United States alone, this translates into a staggering loss of water.

Figure 2:
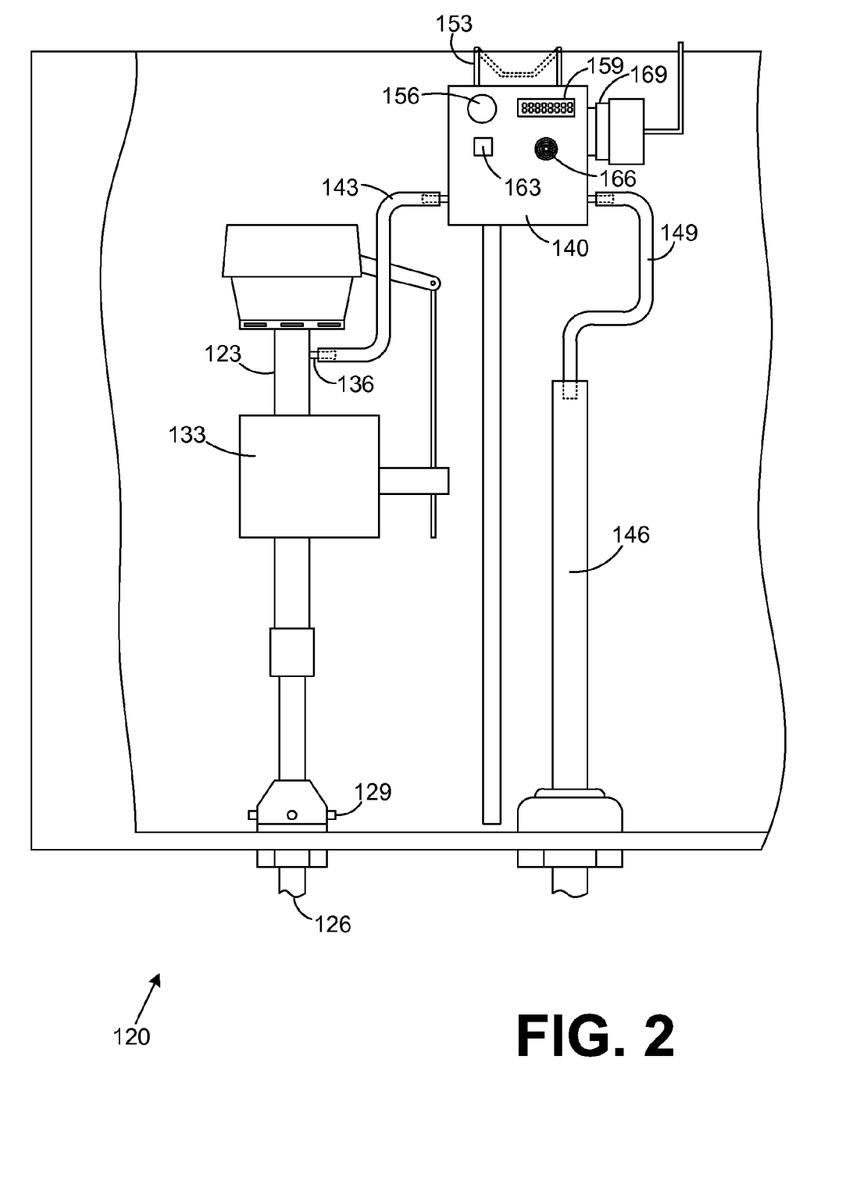
FIG. 2 is a cutaway drawing of portion of a toilet tank of a toilet that employs an automated bowl fill system according to an embodiment of the present invention.

Referring next to FIG. 2, shown is cutaway view of a portion of a toilet tank 120 according to an embodiment of the present invention. Inside the toilet tank 120 is a fill valve 123. The fill valve 123 includes a water inlet 126 that is connected to a water source. The fill valve 123 also includes water outlets 129 that supply water to the toilet tank 120 during the flush cycle 100. The fill valve 123 also includes a float 133 that opens or closes the fill valve 123 based upon the level of water within the toilet tank 120.

The fill valve 123 further includes a bowl fill outlet 136. The bowl fill outlet 136 supplies a flow of water that is employed to refill the toilet bowl of the toilet during a flush cycle 100. The bowl fill outlet 136 is coupled to an inlet of an automated bowl fill system 140 by way of a tube 143. An outlet of the automated bowl fill system 140 is coupled to an overflow tube 146. The overflow tube 146 directs water into the toilet bowl as can be appreciated. Water flowing out of the outlet of the automated bowl fill system 140 is routed to the overflow tube 146 by way of a tube 149.

The automated bowl fill system 140 is suspended in the toilet tank 120 by virtue of a bracket 153. In one embodiment, the automated bowl fill system 140 includes, for example, a push button 156, an LED readout 159 or other type of display device, a photo sensor 163, and an alarm speaker 166. The automated bowl fill system 140 also includes a network interface port 169 that may be coupled to a network such as, for example, the Internet, intranets, wide area networks (WANs), local area networks, wireless networks, or other suitable networks, etc., or any combination of two or more such networks.

During the operation of a toilet to which the toilet tank 120 is attached, the user may initiate the flush cycle 100 by pulling a handle or by manipulating some other initiation device as can be appreciated by those with ordinary skill in the art. The flapper within the toilet tank 120 is pulled up by the action of the user and water begins to drain out of the toilet tank 120 and into the toilet bowl as can be appreciated. As the water level within the toilet tank 120 drops, the float 133 falls thereby opening the fill valve 123. When the fill valve 123 opens, water flows into the toilet tank 120 through the water outlets 129. Also, water attempts to flow out of the bowl fill outlet 136 and into the automated bowl fill system 140.

The automated bowl fill system 140 determines when the toilet tank 120 has been substantially drained of water during the flush cycle 100. At the time that the toilet tank 120 has been substantially drained of water, the automated bowl fill system 140 opens up a bowl fill valve included therein for a predefined period of time to fill the toilet bowl of the toilet with water. In this respect, the predefined period of time is less than the total time of the flush cycle 100 and is also less than the total time it takes to fill the toilet tank 120 with water.

The automated bowl fill system 140 opens the bowl fill valve for a predefined period of time needed to fill the toilet bowl such that no excess water is supplied to the toilet bowl beyond that needed to fill the toilet bowl so that no water is wasted down the drain. In order to determine when the flapper has gone down and that the toilet tank 120 has been substantially drained of water, the automated bowl fill system 140 may employ various devices to track the period of time it takes for the water to substantially drain out of the toilet tank 120 with a timer. Alternatively, the automated bowl fill system 140 may detect when the water level within the toilet tank 120 reaches the bottom such that the toilet tank 120 is substantially drained of water.

In this respect, in one embodiment, the automated bowl fill system 140 initiates the operation of a timer at the start of a flush cycle 100. The automated bowl fill system 140 knows that the flush cycle has started by virtue of detecting a pressure experienced at the inlet of the automated bowl fill system 140 using a pressure sensor. Alternatively, the automated bowl fill system 140 may employ a water level sensor that detects when the water level in the toilet tank 120 drops, thereby indicating the potential start of a flush cycle 100 as will be described. In additional alternatives, the start of the flush cycle may be determined using a switch in the flapper, a motion detector to detect the fall of the water level, a water flow detector associated with the flow of water into or out of the fill valve, or other devices may be employed.

In addition, the automated bowl fill system 140 determines an estimate of an amount of water that was prevented from flowing down the drain of the toilet during the flush cycle 100 due to the operation of the automated bowl fill system 140. In particular, since the bowl fill flow is only allowed to occur for a predefined period of time in order to fill the bowl without losing any further water, it follows that with each flush that the automated bowl fill system 140 is employed, a predefined amount of water is saved. Specifically, any water that might have potentially been lost in the third phase 109 (FIG. 1) will have been conserved. An estimate of the amount of water that is prevented from flowing down the drain in this manner is calculated for each flush cycle 100 by the automated bowl fill system 140. The estimate of the amount of water saved for each flush cycle 100 is stored in a memory of the automated bowl fill system 140 to facilitate this calculation.

Over time, the water savings is added up and displayed in the display device 159 to indicate to users how much water is ultimately saved by the operation of the device. In one embodiment, the automated bowl fill system 140 is powered by batteries. Consequently, it would be advantageous that the display device 159 was not activated unless the toilet tank lid had been removed from the toilet tank 120 so that a user may see it at such time to save power. To conserve power, the automated bowl fill system 140 includes the photo sensor 163 that signals to the automated bowl fill system 140 to activate the display 159 when ambient light is detected. When the toilet lid is placed over the toilet tank 120, then there will be little or no light in the toilet tank 120. However, when the lid of the toilet tank 120 is removed, then light will strike the photo sensor 163. In response to a signal from the photo sensor 163, the automated bowl fill system 140 activates the display 159, thereby displaying the amount of water saved by operation of the automated bowl fill system 140 to consumers. Alternatively, other approaches may be employed to cause the display 159 to activate. For example, a motion detector may be employed to detect motion around the automated bowl fill system 140. Also, a push button may be provided that is depressed to activate the display 159. In any event, regardless of how the display 159 is activated, in one embodiment, it stays activated for a predefined period of time to conserve battery power.

In addition, the automated bowl fill system 140 includes a push button 156 that may be manipulated by a user to calibrate the automated bowl fill system 140 for operation. Specifically, to calibrate the automated bowl fill system 140, a user may flush the toilet tank and then press the push button 156 when the water substantially drains out of the toilet tank 120 and the flapper falls down. The user may then press the push button 156 after the toilet bowl has been filled while the water level rises in the toilet tank 120. By virtue of the two consecutive times in which the push button 156 is depressed, the user thus establishes the time period it takes for the toilet bowl to be refilled. In addition, other approaches to calibration of the automated bowl fill system 140 may be employed as will be discussed.

The automated bowl fill system 140 also includes a speaker 166 to generate an alarm tone when a problem is detected with the operation of the toilet. For example, it may be the case that a leak develops in the flapper of the toilet, thereby periodically causing the water level within the toilet tank 120 to begin to fall without the initiation of a full flush cycle 100. In such case, the water level will fall until the float 133 of the fill valve 123 drops a sufficient distance to open the fill valve 123, whereupon the toilet tank 120 is refilled. If the leak of the flapper persists, the toilet fill valve 123 would continually cycle in this manner, causing a significant loss of water over time until the leaking flapper was fixed.

If the fill valve is opened due to a leak, the automated bowl fill system 140 would initially believe that a new flush cycle 100 has been initiated. However, when the toilet tank 120 fails to fully drain, the automated bowl fill system 140 detects such condition and determines that a leak may exist. In this respect, the automated bowl fill system 140 is configured to determine whether an amount of water has drained out of the toilet tank outside of a flush cycle 100. For example, in one embodiment, the automated bowl fill system 140 detects the fact that the fill valve 123 is opened outside of a full flush cycle 100 using, for example, a pressure sensor. In another embodiment, the automated bowl fill system 140 is configured to detect a drop in the water level in the toilet tank 120 without the water level reaching a minimum level in the toilet tank 120 using, for example, a water level sensor.

Given that such leaks in a toilet tank 120 tend to be periodic in nature, and given that water fails to fully drain from the toilet tank 120 during each of the repetitive "short cycles", the automated bowl fill system 140 is configured to track a number of occurrences of a partial drain of the toilet tank 120. If a predefined number of these short cycles in which the toilet tank 120 is partially drained is detected, then the automated bowl fill system 140 sets off the alarm 166 to alert consumers that the toilet tank 120 is leaking and a significant waste of water may result. Also, the network interface 169 allows the automated bowl fill system 140 to communicate such problems to remote devices, such as, for example, a server at a local municipality that can then contact the consumer to inform them of the loss of water. In this respect, local municipalities may regulate the unnecessary waste of water due to the faulty operation of toilets.

Figure 3:
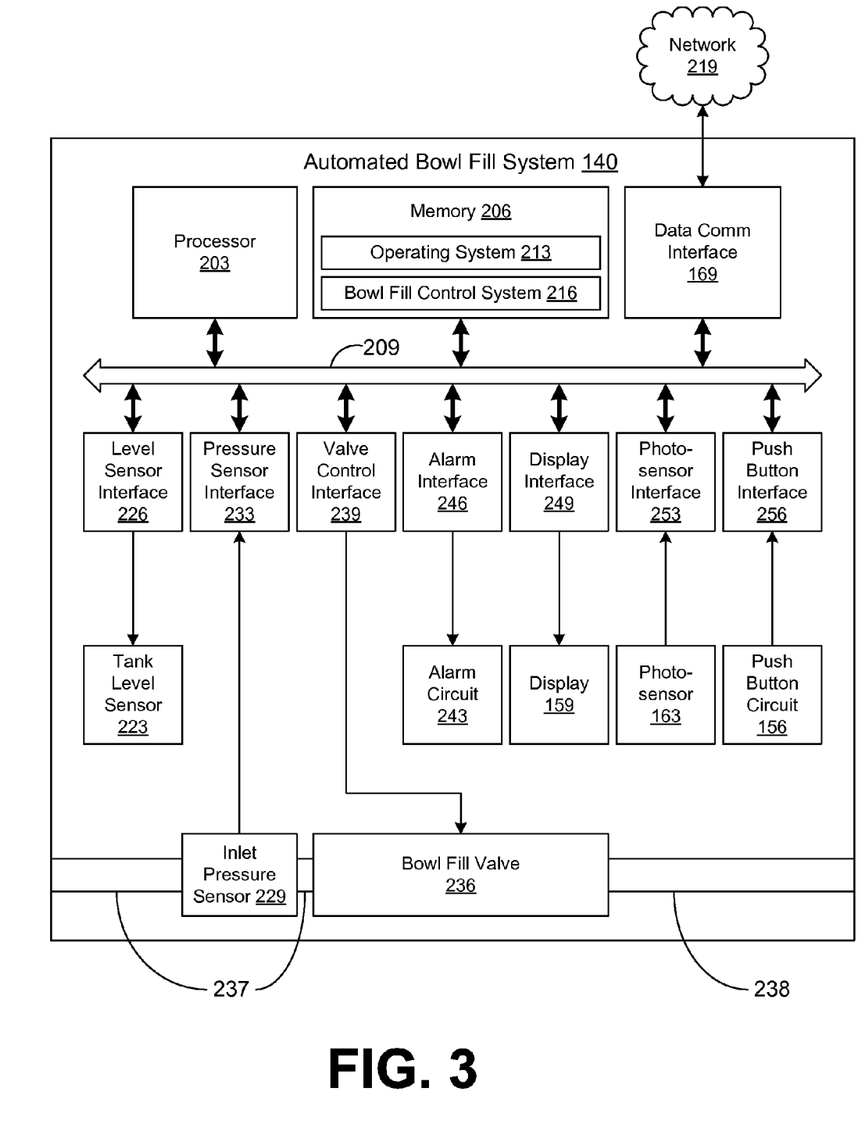
FIG. 3 is a block diagram of one example of the automated bowl fill system employed in the toilet tank of FIG. 2 according to an embodiment of the present invention.

With reference to FIG. 3, shown is one example of the automated bowl fill system 140 according to an embodiment of the present invention. The automated bowl fill system 140 includes a processor circuit having a processor 203 and a memory 206, both of which are coupled to a local interface 209. In this respect, the local interface 209 may comprise, for example, a data bus with an accompanying control/address bus as can be appreciated by those with ordinary skill in the art.

The memory 206 is defined herein as both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (M RAM) and other such devices. The ROM may comprise, for example, a programmable read-only memory (PROM), an erasable programmable read-only memory (EPROM), an electrically erasable programmable read-only memory (EEPROM), or other like memory device.

Stored in the memory 206 and executable by the processor 203 are an operating system 213 and a bowl fill control system 216. In addition, other components or systems may be stored in the memory 206 and executable by the processor 203. The operating system 213 is executed to control the allocation and usage of hardware resources such as the memory, processing time and peripheral devices in the automated bowl fill system 140. In this manner, the operating system 213 serves as the foundation on which applications depend as is generally known by those with ordinary skill in the art. The bowl fill control system 216 is stored in the memory 206 and is executable by the processor 203 to control the various functions of the automated bowl fill system 140. In this respect, the bowl fill control system 216 receives inputs from the various devices associated with the automated bowl fill system 140 and controls the operation of the bowl fill valve as will be described.

In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, or source code that may be expressed in proper format such as object code that is capable of being loaded into a of random access portion of the memory 206 and executed by the processor 203, etc. An executable program may be stored in any portion or component of the memory 206 including, for example, random access memory, read-only memory, a hard drive, compact disk (CD), floppy disk, or other memory components.

The data communications interface 169 is coupled to the local interface 209. In this respect, the data communications interface 169 facilitates coupling to the network 219.

The automated bowl fill system 140 further comprises various components that provide inputs to or are controlled by the bowl fill control system 216. These components comprise, for example, a tank level sensor 223 that is coupled to the local interface 209 through a level sensor interface 226. Also, the automated bowl fill system 140 includes an inlet pressure sensor 229 that is coupled to the local interface 209 through the pressure sensor interface 233. In one embodiment, the automated bowl fill system 140 may employ the tank level sensor 223 in conjunction with the level sensor interface 226. Alternatively, in a second embodiment, the automated bowl fill system 140 may employ the inlet pressure sensor 229 in conjunction with the pressure sensor interface 233. In this respect, the automated bowl fill system 140 employs either the tank level sensor 223 or the inlet pressure sensor 229, where one of these components may not be included in the automated bowl fill system 140 at all. In an additional alternative, the automated bowl fill system 140 may employ both the tank level sensor 223 and the inlet pressure sensor 229 to obtain further information as to the state of the toilet operation. In still other embodiments, other sensors may include, for example, motion detectors, flapper switches, water flow detectors, and other devices.

The automated bowl fill system 140 also includes a bowl fill valve 236 having an inlet 237 and an outlet 238. The bowl fill valve 236 is coupled to the local interface 209 by virtue of the valve control interface 239. In this respect, the bowl fill control system 216 executed by the processor 203 causes the bowl fill valve 236 to open or close as is appropriate. In addition, the automated bowl fill system 140 includes an alarm circuit 243 that is coupled to the local interface 209 by the alarm interface 246. The alarm circuit 243 may include, for example, the alarm speaker 166. Alternatively, the alarm circuit 243 may drive the display 159 in some manner so as to visually indicate a problem exists. In addition, the automated bowl fill system 140 includes the display device 159 that is coupled to the local interface 209 by virtue of a display interface 249. Also, separate warning lights may be included in the automated bowl fill system 140 that provide information as to alarm conditions, etc.

The automated bowl fill system 140 also includes the photo sensor 163 that is coupled to the local interface 209 by virtue of a photo sensor interface 253. In addition, the push button 156 is coupled to the local interface 209 by a push button interface 256. In this respect, the push button interface 256 may comprise de-bouncing circuitry and other interface circuitry as can be appreciated by those with ordinary skill in the art. The level sensor interface 226, pressure sensor interface 233, photo sensor interface 253, and the push button interface 256, and other interfaces (not shown) include, for example, such registers, buffers, and/or other circuitry that make signals available on the local interface 209 to be accessed by the bowl fill control system 216 as executed by the processor 203. Similarly, the valve control interface 239, alarm interface 246, and display interface 249 include, for example, such registers, buffers, and/or other circuitry that allow the bowl fill control system 216 to write various data commands thereto that cause the bowl fill valve 236, alarm circuit 243, or display 159 to act as desired.

In addition, the automated bowl fill system 140 includes other components such as, for example, batteries or other power source that facilitate the operation thereof. For example, in one embodiment the automated bowl fill system 140 may include a power circuit that converts standard AC power into DC power necessary to power all the various components thereof. Alternatively, batteries may be employed. In one embodiment, the bowl fill valve 236 may be, for example, an electro-magnetic actuator valve such as those produced by Arichell Technologies of West Newton, Mass.

In addition, in situations where batteries are employed, the photo sensor 163 may provide input that facilitates whether various components of the automated bowl fill system 140 are powered up, thereby conserving battery life as can be appreciated. Also, the automated bowl fill system 140 may further comprise circuitry that can detect when the battery voltage is low, emitting an alarm such as a "chirp" to inform users that the batteries need to be replaced.

Figure 4A:
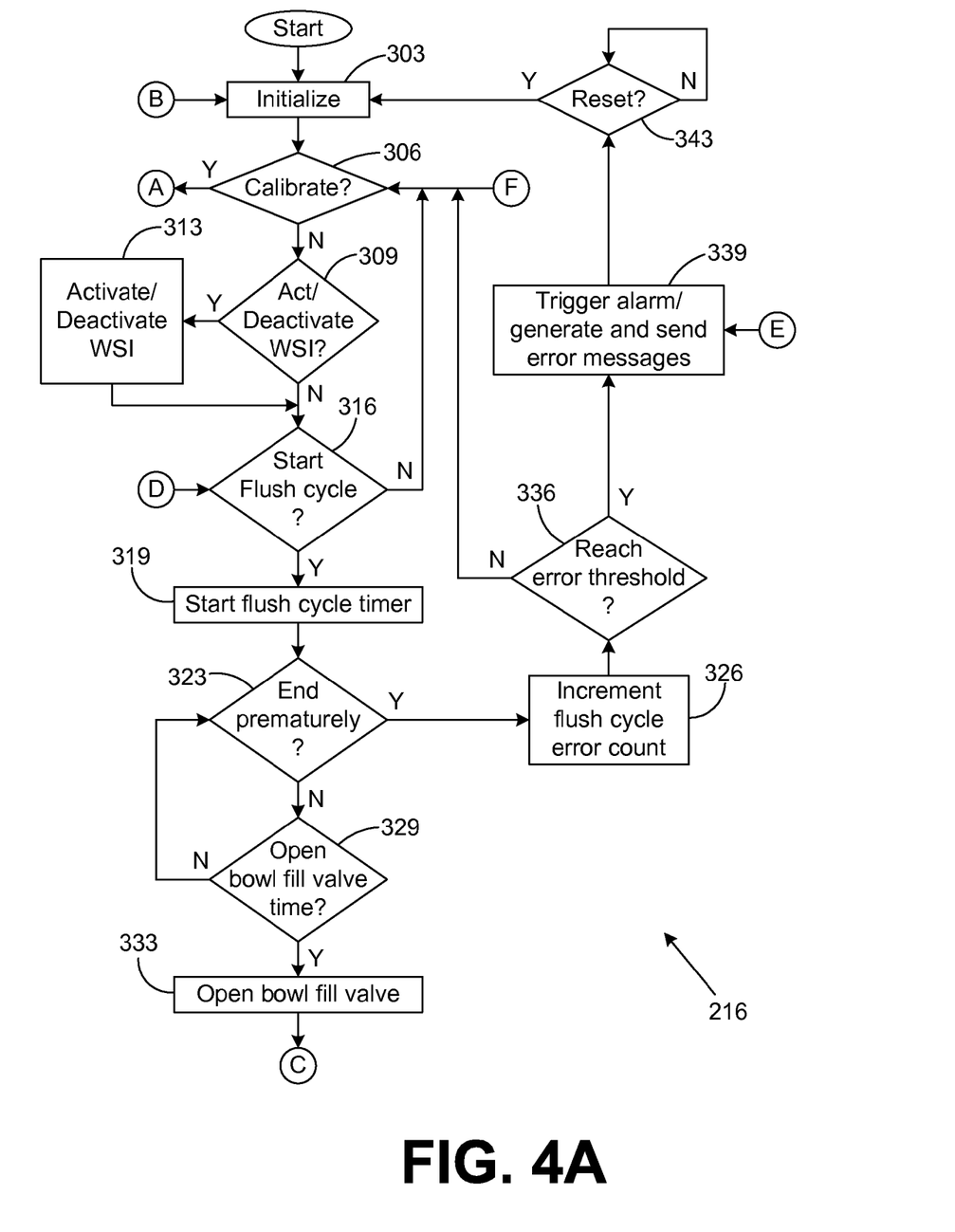
FIGS. 4A, 4B, and 4C are a flow chart illustrating an example of the operation of a bowl fill control system executed in the automated bowl fill system of FIG. 3.
Figure 4B:
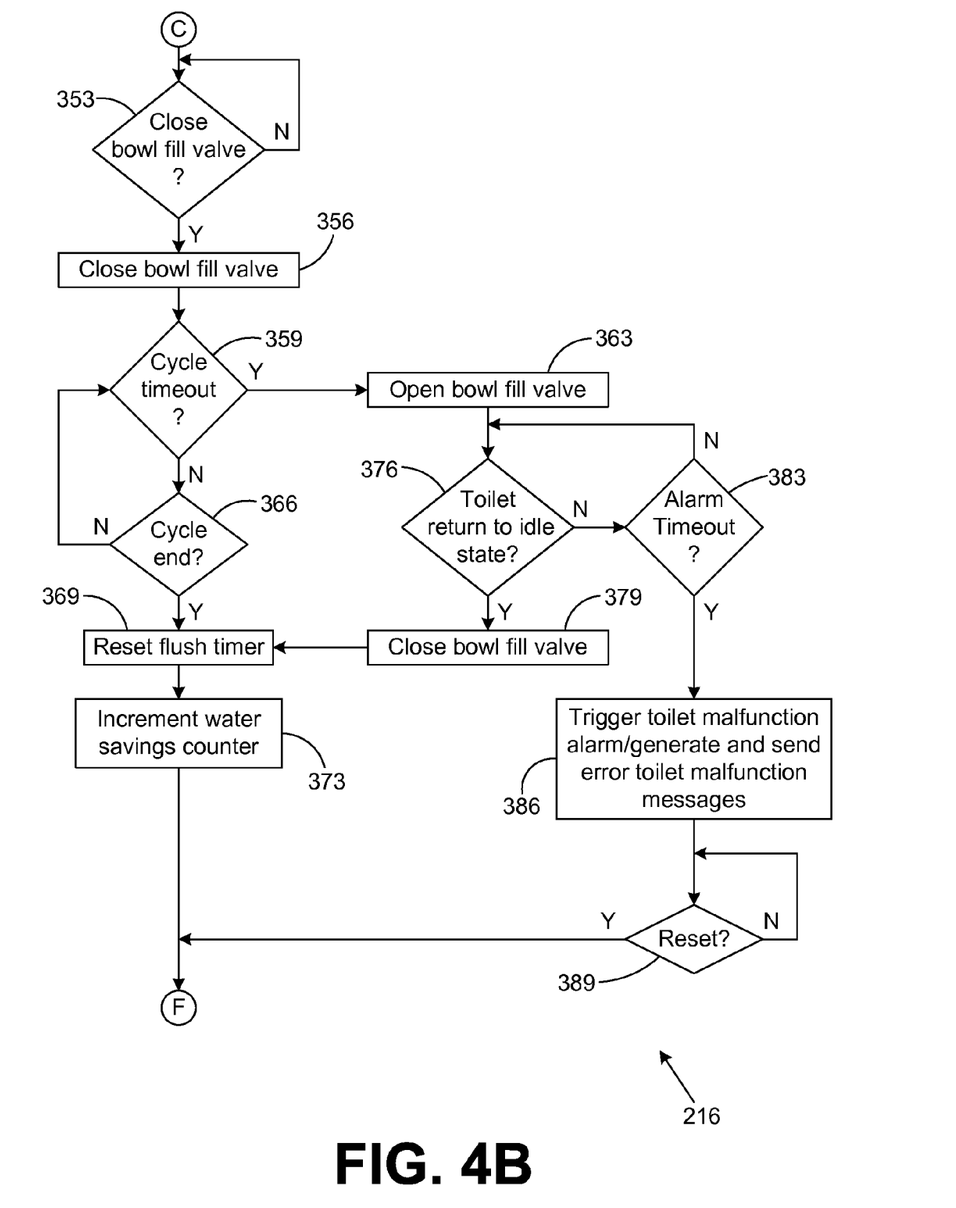
Figure 4C:
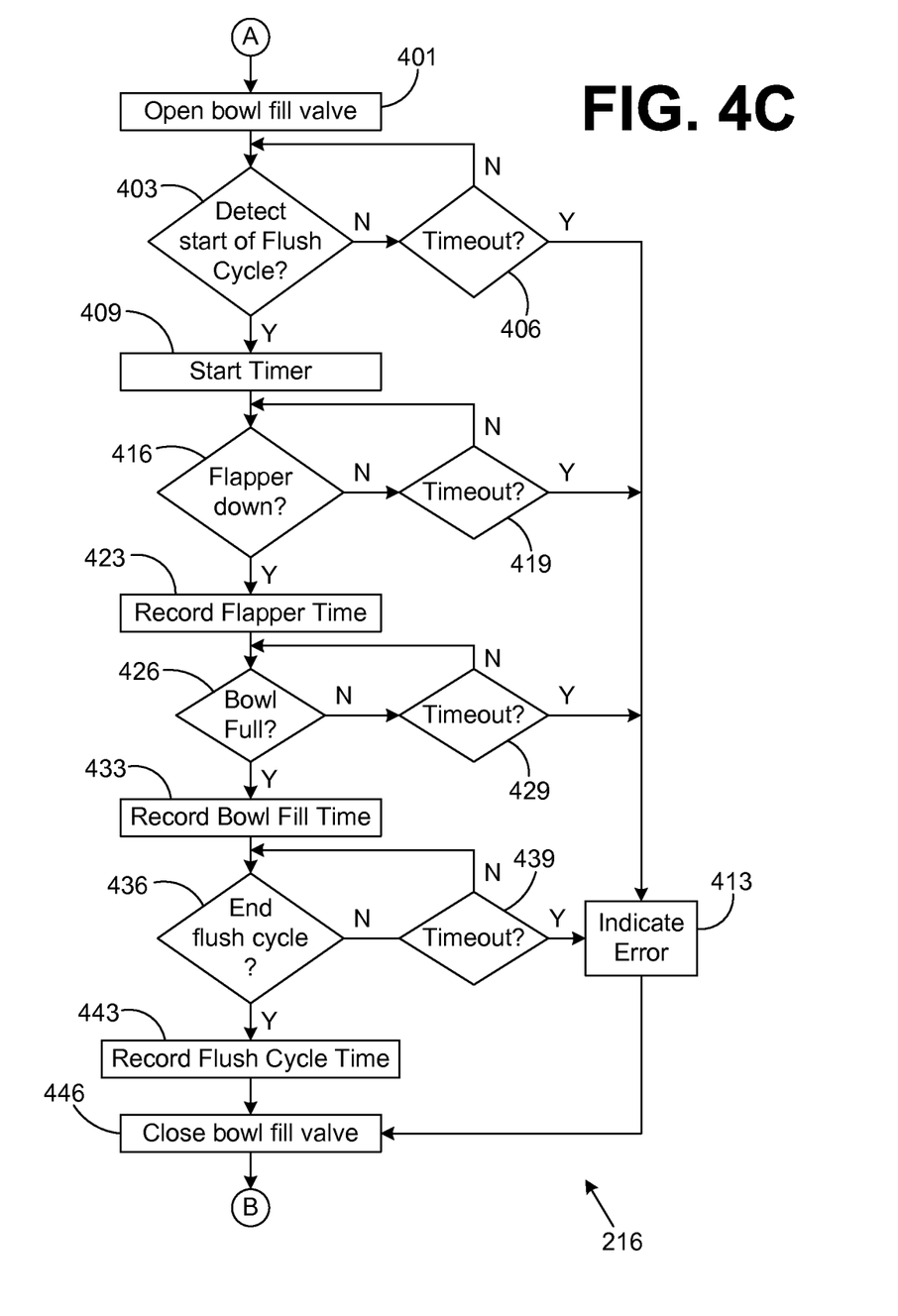

Referring next to FIGS. 4A, 4B, and 4C, shown is one example of a flow chart of the bowl fill control system 216 according to an embodiment of the present invention. Alternatively, the flow chart of FIG. 4 may be viewed as depicting steps of an example of a method implemented in the automated bowl fill system 140 to control the operation thereof. The functionality of the bowl fill control system 216 as depicted by the example flow chart of FIGS. 4A-4C may be implemented, for example, in an object oriented design or in some other programming architecture. Assuming the functionality is implemented in an object oriented design, then each block represents functionality that may be implemented in one or more methods that are encapsulated in one or more objects. The bowl fill control system 216 may be implemented using any one of a number of programming languages such as, for example, C, C++, Assembly, or other programming languages as can be appreciated.

Beginning with box 303, first the bowl fill control system 216 initializes its operation. In this respect, all variables and/or registers and other components are set to initial variables and all circuitry or other components is set in an initial state. Thereafter, in box 306, the bowl fill control system 216 determines whether the bowl fill control system 216 is to be calibrated such that the time periods tracked by the bowl fill control system 216 are determined based on user input. In this respect, the bowl fill control system 216 would enter a calibration mode in which various time periods are established as will be described.

The determination as to whether the bowl fill control system 216 is to enter the calibration mode in box 306 is determined by whether the user presses the push button and holds it down for a predefined period of time such as, for example, three seconds or other time period. If the bowl fill control system 216 is to enter the calibration mode, then the bowl fill control system 216 proceeds to connector A. Otherwise, the bowl fill control system 216 proceeds to box 309.

In box 309, the bowl fill control system 216 determines whether a water savings indicator is to be activated or deactivated. A water savings indicator may be, for example, the display 159 or other such device. If the water savings indicated is to be activated or deactivated, then the bowl fill control system 216 proceeds to box 313 in which the water savings indicator is activated or deactivated as is appropriate. When activated, the water savings indicator displays the amount of gallons of water saved by operation of the automated bowl fill system 140 for a user. In this manner, the user is informed of the actual benefit of the use of the device. The water savings indicator is deactivated, for example, when the lid is placed on the toilet tank 120. It may be desirable to deactivate the indicator when it cannot be viewed so as to conserve battery power. Similarly, various components of the automated bowl fill system 140 such as the input and output devices may be powered down in a "sleep" mode to conserve battery life as can be appreciated.

Thereafter, the bowl fill control system 216 proceeds to box 316. If the water savings indicator is not to be activated in box 309, then the bowl fill control system 216 proceeds to box 316 as shown. In determining whether to activate or deactivate the water savings indicator in box 313, in one embodiment the bowl fill control system 216 consults an input from the photo sensor interface 253 (FIG. 3) to determine whether the photo sensor 163 has detected light, thereby indicating whether the lid of the toilet tank 120 has been removed. If the lid has been removed, it is likely that the user can see the indicator. If no light is detected, then it is likely the lid is in place on the toilet tank 120 and that the user cannot see the indicator. Thus, the determination that the display 159 is to be activated or deactivated in box 309 may be based upon the input from the photo sensor 163 (FIG. 3) as was described above. Alternatively, the water savings indicator such as the display 159 may be activated by pressing the push button 156 for short duration less than the time it would take to initiate the calibration mode as set forth above with respect to box 306. Also, more than a single push button 156 may be included in the automated bowl fill system 140 so that a button may be dedicated to the purpose of activating the display 159. In addition, it may be the case that a motion sensor is employed in the place of the photo-sensor to detect motion in removing the lid of the toilet and replacing the lid of the toilet. As an additional alternative, the indicator may only be activated for a short period of time when conditions indicate it should be activated. In such an embodiment, the indicator would automatically be deactivated after the time period has passed.

Assuming that the bowl fill control system 216 has proceeded to box 316, then the bowl fill control system 216 determines whether a flush cycle 100 has started. The start of a flush cycle 100 may be determined, for example, in any one of a number of ways. For example, the start of a flush cycle 100 may be determined by detecting pressure at the inlet of the automated bowl fill system 140 based upon an input from the inlet pressure sensor 229 (FIG. 3). Specifically, the pressure sensed by the inlet pressure sensor 229 would change from 0 PSI to some pressure value when the fill valve is opened due to the beginning of a flush cycle 100.

Alternatively, the start of a flush cycle 100 may be determined based upon an input from the tank level sensor 223. Specifically, a drop in the water level in the toilet tank 120 may be detected, thereby indicating that a flush cycle 100 may have begun. In other embodiments, one may employ a float valve, motion detection with respect to the water level itself, a rip cord on the handle of the toilet, or a switch that is integrated with the operation of the flapper to indicate whether a flush cycle has started. Each of these devices may be configured to provide an input into the automated bowl fill system 140.

In additional alternatives, the start of the flush cycle 100 may be determined using a motion detector that detects a drop in the water level of the toilet tank 120, a flapper switch that indicates the flapper has opened, a water flow detector included at the inlet of the fill valve that detects water flow into the fill valve, or other approaches may be employed.

Assuming that a flush cycle 100 has not started in box 316, then the bowl fill control system 216 reverts back to box 306. Otherwise, the bowl fill control system 216 proceeds to box 319. In box 319, the bowl fill control system 216 begins the operation of a flush cycle timer. Thereafter, in box 323, the bowl fill control system 216 determines whether the flush cycle 100 has ended prematurely. This may be the case, for example, if the flapper is leaking and the toilet tank has drained by a small amount, thereby activating the bowl fill valve to refill the tank to its complete full state.

A premature end to the flush cycle 100 may be determined in one of any number of ways. For example, if the pressure as detected by the inlet pressure sensor 229 suddenly disappears before an adequate time period has passed that would allow the toilet tank 120 to be completely drained, thereby indicating that the toilet fill valve 123 has ceased operation and is closed, then it is an indication that the toilet fill valve 123 is being activated to refill the toilet tank due to a leak rather than a flush of the toilet. Alternatively, if the tank level sensor 223 detects that the toilet tank 120 is only partially drained of water before it begins to refill, then such is another indication that the flush cycle 100 has ended prematurely.

In this respect, in a normal flush cycle 100, the toilet tank 120 would drain within a predefined period of time. Assuming that the flush cycle 100 has ended prematurely in box 323, then the bowl fill control system 216 proceeds to box 326. Otherwise, the bowl fill control system 216 progresses to box 329. In box 329, the bowl fill control system 216 determines whether it is time to open the bowl fill valve 236. This time occurs when the toilet tank 120 has been substantially drained of water and the flapper has closed thereby allowing the toilet tank 120 to be refilled. A specific time it takes for the toilet tank to substantially drain and for the flapper to fall is recorded in the memory 206 during the calibration mode of operation of the bowl fill control system 216 as will be described. Assuming that the flush cycle timer has reached the time at which the bowl fill valve 235 is to be opened, then the bowl fill control system 216 proceeds to box 333. Otherwise, the bowl fill control system 216 reverts back to box 323 as shown. In box 333, the bowl fill control system 216 opens the bowl fill valve 236.

Reverting back to box 326, assuming that the flush cycle 100 has ended prematurely as determined in box 323, then in box 326 the bowl fill control system 216 increments a flush cycle error count. The flush cycle error count is a variable stored in the memory 206. Thereafter, in box 336 the bowl fill control system 216 determines whether the flush cycle error count has reached a predefined threshold value stored in the memory 206. If the flush cycle error count has reached the threshold as determined in box 336, then the bowl fill control system 216 proceeds to box 339 in which an alarm is triggered and/or a message is generated and transmitted to a remote device over the network 219 (FIG. 3) by way of the data communications interface 169 (FIG. 3). In this respect, remote individuals such as municipal government officials may be alerted to the existence of the leak and the resulting waste of water.

Also, the alarm may be, for example, the activation of the audible alarm through the speaker 166 as described above. Also, a message may be displayed on the display device 159 (FIG. 2) that indicates that a leak exists. This message may provide a diagnosis as to the specific problem, thereby alerting the user as to the existence of the problem. Thereafter, in box 343, the bowl fill control system 216 waits to be reset by the user for normal operation. This is done assuming that the user has fixed the leak and has reset the automated bowl fill system 140. The reset would also stop the alarm condition from occurring. In order to reset the automated bowl fill system 140, the bowl fill control system 216 may wait for the push button 156 to be pressed by a user, etc. Given that the alarm condition exists, the pressing of the push button 156 for this purpose may be distinguished from pressing the same push button 156 for other purposes described herein.

Once the automated bowl fill system 140 has been reset, then the bowl fill control system 216 reverts back to box 303.

Thus, it is seen that the flush cycle error count is maintained in box 326 and that no alarms or error messages are generated until the flush cycle error count reaches a predefined threshold. This prevents alarm conditions from happening prematurely. Specifically, alarm conditions occur only upon the repeated cycling of the fill valve 123 due to a leak in the toilet such as, for example, a leak in the flapper. In this respect, the leak should persist to the point where a significant loss of water results. This would prevent alarms and error messages from being triggered prematurely or haphazardly, thereby hampering the operation of the toilet and causing individuals to needlessly investigate potential problems.

Once the bowl fill valve 236 has been opened in box 333, then in box 353 the bowl fill control system 216 determines when the bowl fill valve 236 is to be closed. Specifically, the bowl fill valve 236 is opened for a predefined period of time necessary to fill the toilet bowl after the flapper has fallen and the toilet tank is refilling. This period of time is tracked using the flush cycle timer that was initiated in box 319 above. Specifically, at specific times during the running of the flush cycle timer, the bowl fill valve 236 is opened in box 333, and is closed in box 353. Assuming that the bowl fill valve 236 is to be closed as the toilet bowl is sufficiently filled in box 353, then the bowl fill control system 216 proceeds to box 356 in which the bowl fill control system 216 causes the bowl fill valve 236 to close.

Thereafter, in box 359, the bowl fill control system 216 determines whether the flush cycle timer has timed out for a specific flush cycle 100. In particular, given that a flush cycle 100 takes a predefined period of time to run to its completion, if the flush cycle 100 takes longer than it should as determined in box 359, then the bowl fill control system 216 proceeds to box 363. Otherwise, the bowl fill control system 216 progresses to box 366.

A cycle time out 359 may be detected by virtue of the fact that the toilet continues to operate even though the amount of time necessary for a complete flush cycle 100 has passed. This may determined, for example, if the inlet pressure sensor 229 still detects pressure at the inlet of the bowl fill valve 236 after the flush cycle 100 should have completed. Alternatively, the tank level sensor 223 (FIG. 3) can determine whether a cycle time out has occurred by virtue of the fact that the water level in the tank has not risen to the full level within the time period of the flush cycle 100.

Assuming that the flush cycle has not yet timed out in box 359, then the bowl fill control system 216 proceeds to box 366 in which it is determined whether the flush cycle 100 has ended. This may be determined, for example, if the inlet pressure sensor 229 does not detect any pressure at the bowl fill valve 236 which indicates that the fill valve 123 has closed, thereby indicating the end of the flush cycle 100. Alternatively, the tank level sensor 223 may detect that the water level in the toilet tank 120 has reached its maximum height, thereby indicating that the flush cycle 100 has ended.

Assuming that the flush cycle has ended as detected in box 366, then the bowl fill control system 216 proceeds to box 369. Otherwise, the bowl fill control system 216 reverts back to box 359. Thus, the bowl fill control system 216 remains in a loop between boxes 359 and 366 waiting to determine whether the flush cycle has ended or whether a flush cycle time out occurs.

Assuming that the bowl fill control system 216 proceeds to box 369, then the bowl fill control system 216 resets the flush timer for the next flush cycle 100. Thereafter, in box 373, the water savings counter stored in the memory 206 is incremented to account for the amount of water saved during the last flush cycle 100. The value stored in the water savings counter is employed to calculate an estimate of the total amount of water saved by the use of the automated bowl fill system 140 for display to a user as described above. Thereafter, the bowl fill control system 216 reverts back to box 306 as described with reference to FIG. 4A.

Assuming that a cycle time out has occurred in box 359 where the fill valve remains open even though the total time for a flush cycle 100 has transpired, then in box 363 the bowl fill control system 216 opens the bowl fill valve 236. A cycle time out may occur due to any one of a number of various conditions. Specifically, for example, while the toilet tank 120 is being refilled during a given flush cycle, it may be the case that the toilet is flushed a second time before the toilet tank 120 is full. As such, the fill valve 123 will remain in an open state beyond the initial flush cycle. This may occur multiple times. Alternatively, it may be the case that the flapper was pulled off of its mounting by the flush and that the toilet is running continuously and that the fill valve 123 is left in an open state. In yet another alternative, some other leak may exist in the toilet causing the fill valve 123 to stay on. In addition, the fill valve itself may be stuck in an open state. In such case, water will run down the overflow tube and, ultimately, down the drain.

However, given that the cycle time out may occur due to a subsequent flush before the toilet tank 120 has been completely refilled, in box 363 the bowl fill control system 216 opens the bowl fill valve 236. Thereafter, in box 376, a bowl fill control system 216 determines whether the toilet has returned to an idle state such that the fill valve 123 is closed. This would indicate that the toilet tank 120 has completely refilled and that the toilet is ready to operate the next flush cycle 100 initiated by the next individual.

In order to determine whether the toilet has returned to the idle state, assuming that the inlet pressure sensor 229 is employed, then the bowl fill control system 216 may periodically cause the bowl fill valve 236 to close for a moment to determine whether there is pressure at the inlet of the bowl fill valve 236 as sensed by the inlet pressure sensor 229. Such momentary closing of the bowl fill valve 236 may occur, for example, at predefined intervals such as every 30 seconds or other time interval as can be appreciated. Alternatively, if the tank level sensor 223 is employed, it only need be determined whether the water level in the toilet tank 120 has returned to its maximum height, thereby indicating that the toilet has entered an idle state. In an additional alternative, a water flow sensor may be employed at the inlet of the fill valve that indicates that the toilet has entered into the idle state by virtue of the fact that all flow of water into the fill valve has ceased. Alternatively, other approaches may be employed to determine if the toilet is in an idle state. If the toilet has finally returned to the idle state such that the fill valve 123 is in the off position in box 376, then the bowl fill control system 216 proceeds to box 379.

In box 379, the bowl fill valve 236 is closed. Thereafter, the bowl fill control system 216 proceeds to box 369 as shown. This reflects the fact that the toilet has been determined to be in an idle state due to the fact that the fill valve 123 is closed as determined in box 376. Therefore, the bowl fill valve 236 can be closed and the bowl fill control system 216 can proceed to box 369 for normal operation. In this respect, the bowl fill valve 236 is thus left open until the toilet returns to an idle state to ensure that the toilet bowl will be filled with water as would be the case, for example, if multiple flushes occur back to back before individual flush cycles are completed.

However, if the toilet has not been detected to have returned to the idle state in box 376, then the bowl fill control system 216 proceeds to box 383. In box 383, it is determined whether an alarm time out has occurred. In this respect, the flush cycle timer continues to run and if it is determined that the toilet has not returned to the idle state such that the fill valve 123 remains open for a predefined period of time that well exceeds a single flush cycle, then the bowl fill control system 216 proceeds to box 386 in which a toilet malfunction alarm is triggered and/or a message is generated and transmitted to a remote device via the network 219 (FIG. 3). The predefined period of time may be, for example, the amount of time necessary to accommodate a predefined number of full flush cycles that may occur back to back. It may be deemed unlikely, for example, that more than four or other designated number of flush cycles 100 would occur back to back before the toilet returns to the idle state and the fill valve is closed. Consequently, the predefined period of time may be set to equal the time of four or other number of consecutive flush cycles 100.

Alternatively, if, for example, the flapper has been pulled off of its mounting, then the toilet will continually run resulting in the alarm time out as determined in box 383. In this respect, the toilet malfunction alarm and/or message transmitted to a remote device will alert users and authorities at the local municipality that the toilet is malfunctioning resulting in a waste of water. The toilet malfunction alarm may be, for example, a beeping sound transmitted by the speaker 166 (FIG. 2) or other type of alarm device.

After the toilet malfunction alarm is triggered and/or the message is sent in box 386, then the bowl fill control system 216 proceeds to box 389 in which it is determined whether a reset condition has occurred such that a user has fixed the malfunction of the toilet and has reset the bowl fill control system 216 for operation. This may be done, for example, by pressing the push button 156 as described above. Thereafter, the bowl fill control system 216 reverts back to box 306 as shown.

With reference back to box 306, assuming that it is determined that the bowl fill control system 216 is to enter into calibration mode due to the action by the user in pressing the push button 156 in an appropriate manner or by virtue of some other action taken on the part of the user, then the bowl fill control system 216 proceeds to box 401. In box 401, the bowl fill valve 236 is opened for the calibration cycle. Then, in box 403, the bowl fill control system 216 detects the start of the flush cycle 100. In this respect, to calibrate the automated bowl fill system 140, the user places the bowl fill control system 216 in calibration mode and then flushes the toilet.

The bowl fill control system 216 may detect the start of the flush cycle by detecting, for example, an amount of pressure at the inlet of the bowl fill valve 236 in the event that the inlet pressure sensor 229 is used. Alternatively, the bowl fill control system 216 can detect the start of the flush cycle 100 by determining if the water level in the toilet tank 120 has dropped using the tank level sensor 223. If the start of the flush cycle is not detected in box 403, then the bowl fill control system 216 proceeds to box 406. Otherwise, the bowl fill control system 216 progresses to box 409.

In box 406, the bowl fill control system 216 determines whether a time out has occurred such that the user has failed to flush the toilet. If not, then the bowl fill control system 216 reverts back to box 403. Otherwise, the bowl fill control system 216 proceeds to box 413. In box 413 an error is indicated such that the calibration of the automated bowl fill system 140 has failed. In such case, the timing of the flush cycle and the specific timing events employed during the course of the operation of the bowl fill control system 216 will be those that were previously entered in a previous calibration cycle, or alternatively, default timing values may be employed.

Referring back to box 403, if the start of a flush cycle 100 is detected, then in box 409, the flush cycle timer is started. Thereafter, in box 416, it is determined whether the flapper has fallen down over the opening in the toilet tank 120 (FIG. 2) such that the toilet tank 120 has substantially drained of water. This may be detected, for example, by a user's pressing the push button 156 when they see the flapper fall, by employing a switch included within the structure of the flapper itself, or by identifying when the water level has fallen to the minimum point based upon an input from the tank level sensor 223 when the tank level sensor is in use.

If the flapper has not fallen down as detected in box 416, then the bowl fill control system 216 proceeds to box 419 in which it is determined whether a time out has occurred. This time out may be predefined and stored in the memory 206. If a time out occurs, then the bowl fill control system 216 proceeds to box 413 as shown. Otherwise, the bowl fill control system 216 reverts back to box 416. Assuming that the flapper is down as detected or determined in box 416, the bowl fill control system 216 proceeds to box 423 in which the current time of the timer is recorded so as to be used as the time at which the bowl fill valve 236 is to be opened as set forth in box 329 above.

Thereafter, in box 426, the bowl fill control system 216 determines whether the toilet bowl is full. This may determined, by a user manipulation of the push button 156 when they see that the toilet bowl has reached its fullest point. If the toilet bowl has not been indicated as full as determined, for example, by the manual manipulation of the push button 156 by a user in box 426, then the bowl fill control system 216 proceeds to box 429 in which it is determined whether a time out has occurred such that the expected manual input has taken too long to be received.

If a time out occurs in box 429, then the bowl fill control system 216 proceeds to box 413. Otherwise, the bowl fill control system 216 reverts back to box 426. Assuming that the user has indicated that the toilet bowl is full based upon the manual manipulation of the push button 156, then the bowl fill control system 216 proceeds to box 433 in which the time is recorded. This time will be employed to determine when the bowl fill valve 236 is to be closed in box 353 as described above.

Thereafter, in box 436, the bowl fill control system 216 determines whether the end of the flush cycle 100 has occurred. This may be determined, for example, by detecting whether the inlet pressure sensor 229 senses pressure due to the fact that the fill valve 123 is open. In this respect, the bowl fill control system 216 may intermittently cause the bowl fill valve 236 to close for a brief period of time to determine whether the inlet pressure sensor 229 detects a pressure head at the inlet of the bowl fill valve 236 as was described, for example, in box 376 above.

Alternatively, in the event that the tank level sensor 223 is employed, the end of the flush cycle 100 may be determined by detecting whether the water level within the toilet tank 120 has reached its maximum height. As an additional alternative, the user may press the push button 156 at the time that the flush cycle ends to indicate the end of the flush cycle. Assuming that the flush cycle has not ended in box 436, then the bowl fill control system 216 proceeds to box 439 in which it is determined whether a time out has occurred such that the end of the flush cycle 100 did not occur when expected or within a reasonable period of time. In this respect, the time out may be a predefined value stored in the memory 206. Assuming that a time out has occurred, then the bowl fill control system 216 proceeds to box 413. Otherwise, the bowl fill control system 216 reverts back to box 436.

Assuming that the end of the flush cycle 100 is detected in box 436, then the bowl fill control system 216 proceeds to box 443 in which the total time of the flush cycle 100 is recorded in the memory 206. In this respect, the time of the flush cycle 100 is employed to determine whether a cycle time out has occurred in box 359 as described above. Thereafter, the bowl fill control system 216 proceeds to box 446 in which the bowl fill valve 236 is closed. Next, the bowl fill control system 216 reverts back to box 303 to begin normal operation. In addition, after an error condition is indicated in box 413, the bowl fill control system 216 proceeds to box 446 as shown.

Although one example of the bowl fill control system 216 is discussed as being embodied in software or code executed by general purpose hardware as discussed above, as an alternative the bowl fill control system 216 may also be embodied in dedicated hardware or a combination of software/general purpose hardware and dedicated hardware. If embodied in dedicated hardware, the bowl fill control system 216 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIGS. 4A-4C show the architecture, functionality, and operation of an implementation of the bowl fill control system 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIGS. 4A-4C shows a specific order of execution, it is understood that the order of execution may differ from that which is depicted. For example, the order of execution of two or more blocks may be scrambled relative to the order shown. Also, two or more blocks shown in succession in FIGS. 4A-4C may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the bowl fill control system 216 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the bowl fill control system 216 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method of controlling a flow of water from a fill valve in a toilet tank to a toilet bowl of a toilet using a bowl fill valve, wherein an inlet of the bowl fill valve is coupled to a bowl fill outlet of the fill valve and an outlet of the bowl fill valve is channeled to the toilet bowl, the method comprising:

determining when the toilet tank has been substantially drained of water during a flush cycle; and opening the bowl fill valve for a predefined period of time after the toilet tank has been substantially drained of water to fill the toilet bowl of the toilet with water, wherein the predefined period of time is less than a total time of the flush cycle.

2. The method of claim 1, wherein determining when the toilet tank has been substantially drained of water during the flush cycle comprises tracking a period of time it takes for the water to substantially drain out of the toilet tank with a timer.

3. The method of claim 2, further comprising detecting a start of the flush cycle, wherein operation of the timer is initiated at the start of the flush cycle.

4. The method of claim 3, wherein the start of the flush cycle is detected by detecting a change in pressure at the inlet of the bowl fill valve.

5. The method of claim 3, wherein the start of the flush cycle is detected by detecting a drop in a water level in the toilet tank.

6. The method of claim 1, wherein determining when the toilet tank has been substantially drained of water during the flush cycle further comprises determining whether a water level in the toilet tank has fallen to a predefined minimum level during the flush cycle.

7. The method of claim 1, wherein opening the bowl fill valve for the predefined period of time after the toilet tank has been substantially drained of water to fill the toilet bowl of the toilet with water, further comprises:

opening the bowl fill valve after the toilet tank has been substantially drained of water;

initiating operation of a timer that tracks a passing of the predefined period of time; and closing the bowl fill valve after a lapse of the predefined period of time.

8. The method of claim 1, further comprising determining an estimate of an amount of water that was prevented from flowing down a drain associated with the toilet during the flush cycle due to an operation of the bowl fill valve, the operation comprising opening the bowl fill valve for the predefined period of time.

9. The method of claim 8, further comprising determining a second estimate of a total amount of water that was prevented from flowing down the drain associated with the toilet over a number of flush cycles, where the total amount of water is due to the operation of the bowl fill valve during each of the number of flush cycles.

10. The method of claim 9, further comprising displaying the second estimate of the total amount of water.

11. The method of claim 1, further comprising determining whether an amount of water has drained out of the toilet tank outside of the flush cycle.

12. The method of claim 11, wherein determining whether the amount of water has drained out of the toilet tank outside of the flush cycle further comprises detecting a drop in a water level in the toilet tank without the water level reaching a predefined minimum level in the toilet tank.

13. The method of claim 11, wherein determining whether the amount of water has drained out of the toilet tank outside of the flush cycle further comprises detecting an opening of the fill valve outside of the flush cycle.

14. The method of claim 13, wherein detecting the opening of the fill valve outside of the flush cycle further comprises determining whether the fill valve has remained open for at least a second period of time, where the second period of time is an amount of time sufficient to substantially drain the water from the toilet tank.

15. The method of claim 11, further comprising setting off an audible alarm upon detection that the amount of water has drained out of the toilet tank outside of the flush cycle.

16. The method of claim 11, further comprising transmitting an alert message from a bowl fill valve controller that drives the bowl fill valve to a remote device upon detection that the amount of water has drained out of the toilet tank outside of the flush cycle, the alert message informing of a potential leak in the toilet.

17. The method of claim 1, wherein opening the bowl fill valve for the predefined period of time after the toilet tank has been substantially drained of water to fill the toilet bowl of the toilet with water further comprises applying an amount of power to a solenoid associated with the bowl fill valve.

18. The method of claim 14, further comprising determining the amount of time sufficient to substantially drain the water from the toilet tank based upon a start time of the flush cycle and an indication that the toilet tank has stopped draining.

19. The method of claim 1, further comprising determining that the flush cycle has not been completed within a predefined flush cycle time out period.

20. The method of claim 19, further comprising reopening the bowl fill valve in response to the determination that the flush cycle has not been completed.

\* \* \* \* \*